United States Patent
Rocca et al.

[11] Patent Number: 5,993,340
[45] Date of Patent: Nov. 30, 1999

[54] TIGHTENER FOR A TRANSMISSION BELT

[75] Inventors: Carlo Rocca, Turin, Italy; Marc Theobald, Wadgassen, Germany; Angelo Mennuti, Nichelino, Italy

[73] Assignee: Dayco Europe S.P.A., Zona Industriale Vallecupa, Italy

[21] Appl. No.: 09/013,224

[22] Filed: Jan. 26, 1998

[30] Foreign Application Priority Data

Jan. 31, 1997 [IT] Italy .................................. TO97A0072

[51] Int. Cl.$^6$ ................................ F16H 7/08; F16H 7/14; F16H 7/12
[52] U.S. Cl. ........................... 474/109; 474/113; 474/133
[58] Field of Search .................................... 474/101, 115, 474/117, 133, 134, 135, 136, 138, 109, 110, 111, 113, 112

[56] References Cited

U.S. PATENT DOCUMENTS

| | | |
|---|---|---|
| 2,490,974 | 12/1949 | Mallory . |
| 4,596,538 | 6/1986 | Henderson . |
| 4,938,734 | 7/1990 | Green et al. . |
| 5,236,396 | 8/1993 | Golovatai-Schmidt et al. ....... 474/135 |
| 5,244,438 | 9/1993 | Golovatai-Schmidt ................. 474/117 |
| 5,250,009 | 10/1993 | Sidwell et al. .......................... 474/117 |
| 5,348,514 | 9/1994 | Foley ....................................... 474/135 |
| 5,399,124 | 3/1995 | Yamamoto et al. .................... 474/135 |
| 5,443,424 | 8/1995 | Henderson .............................. 474/135 |
| 5,462,494 | 10/1995 | Rogalla .................................. 474/135 |
| 5,599,245 | 2/1997 | Giese ...................................... 474/135 |
| 5,630,767 | 5/1997 | Hirabayashi et al. ................. 474/135 |
| 5,795,257 | 8/1998 | Giese et al. ............................ 474/135 |

FOREIGN PATENT DOCUMENTS 19623485  12/1996  Germany .

*Primary Examiner*—Thomas R. Hannon
*Assistant Examiner*—Matthew A. Kaness
*Attorney, Agent, or Firm*—Stevens, Davis, Miller & Mosher, L.L.P.

[57] ABSTRACT

Stretcher for a transmission belt comprising a fixed part suitable for being rigidly connected to a support structure, a movable part hinged to the fixed part about a first axis, a pulley carried by the movable part and rotating with respect thereto about a second axis distinct from the first axis and parallel thereto, a spring interposed between the fixed part and the movable part and suitable for loading in use the movable part in the direction tending to keep the pulley in engagement with the relative belt, and a damping element provided with a base wall rigidly fixed to the fixed part and with an annular friction portion extending axially from the base wall and cooperating with a seat produced in the movable part.

9 Claims, 1 Drawing Sheet

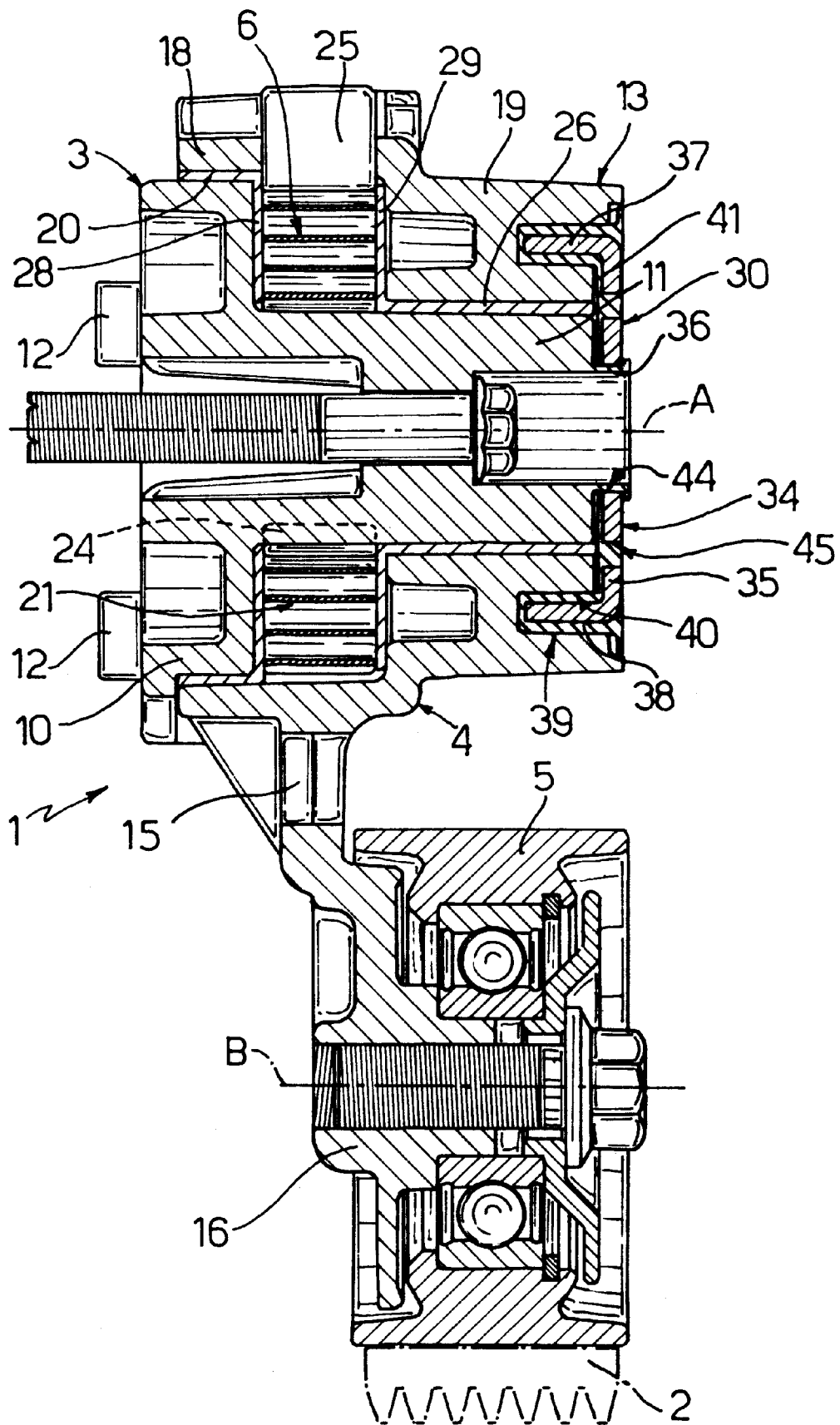

TIGHTENER FOR A TRANSMISSION BELT

BACKGROUND OF THE INVENTION

The invention relates to a stretcher, i.e., belt tightner for a transmission belt and particularly but not exclusively for a belt for transmitting motion from the drive shaft of an internal combustion engine to auxiliary elements driven by the said engine.

Stretchers are known which comprise a fixed part suitable for being rigidly connected to a support structure integral with the engine block, a movable part hinged to the fixed part about a first axis, a pulley carried by the movable part and rotating with respect thereto about a second axis distinct from the first axis and parallel thereto, and a spring interposed between the fixed part and the movable part, which loads the movable part in the direction tending to keep the pulley in engagement with the relative belt.

Variations in belt tension due to the selective actuation of the various accessories and to wear are therefore compensated by consequent variations in the deformation of the spring and corresponding movements of the axis of rotation of the pulley.

Because the belt transmits a pulsating load to the pulley, to limit the oscillations and prevent the occurrence of resonance phenomena, damping means interposed between the fixed part and the movable part are generally provided.

According to a known embodiment, such damping means comprise a pair of friction discs which are integral with the fixed part and the movable part respectively, face to face with each other and axially loaded by a spring so as to cooperate with each other with respective annular friction surfaces preferably having a conical shape.

The known stretchers of the type briefly described have a number of disadvantages.

In particular, the above-mentioned damping means comprise a large number of components and therefore involve long times and high costs for manufacture and assembly.

Furthermore, the dimensions of the known stretchers are large because it is necessary to provide an adequate support of the movable part with respect to the fixed part to withstand the tilting moments (i.e. about an axis at right angles to the axes of rotation) transmitted to the movable part by the pulley, the latter being supported in a projecting manner.

SUMMARY OF THE INVENTION

The object of the invention is to produce a stretcher for belts which enables the disadvantages associated with the known stretchers specified above to be eliminated.

This object is achieved by the invention in that it relates to a stretcher for a transmission belt of the type comprising a fixed part suitable for being rigidly connected to a support structure, a movable part hinged to the said fixed part about a first axis, a pulley carried by the said movable part and rotating with respect thereto about a second axis distinct from the first axis and parallel thereto, flexible means interposed between the said fixed part and the said movable part and suitable for loading in use the said movable part in the direction tending to keep the said pulley in engagement with the relative said belt, and means of damping by friction interposed between the said fixed part and the said movable part, characterized in that the said damping means comprise a damping element provided with a securing portion rigidly fixed to one of the said fixed and movable parts and with an annular friction portion extending axially from the said securing portion and cooperating with a seat produced in another of the said fixed and movable parts.

BRIEF DESCRIPTION OF THE DRAWING

For an improved understanding of the invention a preferred embodiment will now be described below, by way of non-exhaustive example and with reference to the accompanying drawing which shows an axial section thereof.

DETAILED DESCRIPTION OF THE INVENTION

With reference to the illustration, in its entirety 1 denotes a stretcher for a belt 2 with multiple grooves (multi-V) for driving the auxiliary elements (not shown) of an internal combustion engine (not shown).

In known manner the stretcher 1 substantially comprises a fixed part 3 suitable for being rigidly connected to a support structure (not shown), such as a support plate for the auxiliary elements fixed to the engine block, a movable part 4 hinged to the fixed part 3 about a first axis A, a pulley 5 carried in projecting manner by the movable part 4 and rotating with respect thereto about a second axis B distinct from the first axis A and parallel thereto, and a spring 6 interposed between the fixed part 3 and the movable part 4, which loads the movable part in the direction tending to keep the pulley 5 in engagement with the belt 2.

More particularly, the fixed part 3 integrally comprises a flange 10 suitable for cooperating axially with the support structure and a tubular pin 11 of axis A extending axially in projecting manner from the flange 10. The flange 10 has a plurality of frontal teeth 12 suitable for engaging respective seats (not shown) of the support structure to anchor the fixed part 3 in the angular direction.

The movable part 4 integrally comprises a hub 13 coaxial to the pin 11 and mounted in rotating manner thereon, an arm 15 extending radially in a projecting manner from the hub 13, and a tubular portion 16, of axis B, integrally connected to an end of the arm 15 and having the function of supporting the pulley 5.

The hub 13 of the movable part 4 is substantially bell-shaped and comprises a first portion 18 and a second portion 19 which are axially adjacent and have a larger and smaller diameter respectively.

For a section of its own axial length, the first portion 18 is disposed round the flange 10 and is supported radially thereon by means of a bush 20 which, with the said flange 10, defines a friction torque of pre-determined coefficient. For the remaining section of its own length the first portion 18 delimits with the pin 11 an annular chamber 21 housing the spring 6. The latter comprises a strip of steel spiral-wound round the pin 11 and having an internal end 24 secured in known manner to the pin 11 and an external end 25 secured in known manner to the portion 18.

The second portion 19 is supported radially by the pin 11 with the interposition of a bush 26 which defines with the said pin 11 a friction torque of pre-determined coefficient.

The bush 20 and the bush 26 have respective end, internal and external respectively, flat annular flanges 28, 29 which cooperate axially with opposite flanks of the spring 6 and are interposed between the latter and, respectively, the flange 10 and the second portion 19 of the hub 13.

Finally the stretcher 1 comprises a damping element 30 interposed between the pin 11 and the movable part 4.

The damping element 30 substantially comprises a metallic cupped core 34 having a substantially flat circular base wall 35 rigidly fixed onto a free end 36 of reduced diameter of the pin 11 and a substantially cylindrical lateral wall 37 extending in projecting manner from an external periphery of the base wall 35.

The damping element 30 also has a coating 38 of plastics material extending over the face of the base wall 35 facing towards the hub 13 and over the entire surface of the lateral wall 37, so as to form therewith an annular friction crown 39 engaging an annular seat 40, of complementary form, produced on a front face 41 of the portion 19 of the hub 13. The material of the coating 38 is selected so as to define with the hub 13 a friction torque of pre-determined coefficient to ensure, in use, adequate oscillation damping properties. The contact between the annular crown 39 and the relative seat 40 conveniently takes place either along the internal and external cylindrical surfaces, or along the annular front surface of the crown 39.

The core 34 is provided with an axial hole 44, engaged in forced manner by the end 36 of the pin 11; the end 36 is thus pressed onto the internal edge of the base wall 35 so as to ensure a "pack" mounting on the pin 11, i.e. substantially with no axial play, of the group comprising the bush 20, the spring 6, the bush 26 and the hub 13.

The coating 38 is applied to the core 34 by means of over-moulding; for this purpose the core 34 is provided with a plurality of holes 45 surrounding the axial hole 44 and suitable for being engaged by the material of the coating 38, during the moulding phase, to ensure the anchorage of the said coating 38 to the core 34.

The operation of the stretcher 1 is per se known and will not therefore be described in detail.

The oscillations of the movable part 4 with respect to the fixed part 3, in response to the pulsating dynamic variations in pull of the belt 2, are damped by the action of the bushes 20 and 26 and of the damping element 30.

According to the invention, this damping element is particularly economical to produce and simple and quick to assemble. Furthermore, in addition to the damping of the oscillations, the engagement between the annular crown 39 and the associated seat 40 also helps radially to support the movable part 4 with respect to the fixed part 3, and in particular to balance the tilting moment.

Finally, it will be clear that modifications and variants which do not depart from the protective scope of the invention may be introduced to the stretcher 1 described.

For example, the damping element 30 could be rigidly fixed to the hub 13 and be provided with an annular friction portion 39 housed in a seat produced in the pin 11.

The coating 38 could be made of elastomer material instead of plastics material.

We claim:

1. A stretcher (1) for a transmission belt (2) comprising:
   a fixed part (3) for being rigidly connected to a support structure,
   a movable part (4) hinged to said fixed part (3) about a first axis (A),
   a pulley (5) carried by said movable part and rotating with respect thereto about a second axis (B) distinct from said first axis (A) and parallel thereto,
   flexible means (6), interposed between said fixed part (3) and said movable part (4), for loading in use said movable part (4) in the direction tending to keep said pulley (5) in engagement with the relative said belt (2), and
   means for damping (20, 26, 30) by friction movement of said movable part (4) relative to said fixed part (3), said means for damping (20, 26, 30) interposed between said fixed part (3) and said movable part (4) and comprising a damping element (30) provided with a securing portion (35) rigidly fixed to one of said fixed and movable parts (3, 4) and with an annular friction portion (39) extending axially from said securing portion (35) and cooperating with a seat (40) produced in another of said fixed and movable parts (3, 4),
   wherein said securing portion is a substantially flat base wall (35) of said damping element (30) fixed to an end portion (36) of said one of said fixed and movable parts (3, 4), and that said seat (4) has a form corresponding to said annular friction portion (39) and is formed in a front face (41) of said another of said fixed and movable parts (3, 4).

2. The stretcher according to claim 1, wherein said damping element (30) comprises a metallic core (35) and a friction coating (38) extending at least over said annular friction portion (39).

3. The stretcher according to claim 2, wherein said coating (38) is of a plastics material.

4. The stretcher according to claim 2, wherein said coating (38) is of an elastomer material.

5. The stretcher according to claim 1, wherein said securing portion of said damping element (30) is fixed to said fixed part (3) of said stretcher (1), and said annular friction portion (39) is substantially cylindrical in shape and extends in a projecting manner from a periphery of said base wall (35), said seat (40) being produced in said movable part (4) of said stretcher (1).

6. The stretcher according to claim 1, wherein said fixed part (3) comprises a pin (11) defining said first axis (A) and said end portion (36) for mounting said damping element (30), and said movable part (4) comprises a hub (13) mounted in rotating manner on said pin (11) and defining said front fact (41) wherein is produced said seat (40).

7. The stretcher according to claim 6, wherein said base wall (35) of said damping element (30) is fixed to said end portion (36) of said pin (11) by means of a forced connection.

8. The stretcher according to claim 6, wherein said hub (13) is supported on said fixed part (3) by a pair of bushes (20, 26) spaced between said hub and said fixed part in the axial direction, said spring (6) being housed in a chamber (21) delimited externally by said hub (13) and internally by said pin (11), and interposed axially between said bushes (20, 26).

9. The stretcher according to claim 8, wherein said spring (6) is a spiral spring and said bushes (20, 26) comprise respective radial flanges (28, 29) cooperating axially with said spring (6).

* * * * *